(12) United States Patent
Espieu et al.

(10) Patent No.: US 7,260,647 B2
(45) Date of Patent: Aug. 21, 2007

(54) METHOD OF LOAD BALANCING TRAFFIC AMONG ROUTERS IN A DATA TRANSMISSION SYSTEM

(75) Inventors: Jean-Pierre Espieu, Vence (FR); Fabrice Kah, Cagnes sur Mer (FR); Arnaud Lund, Cagnes sur Mer (FR); Catherine Soler, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 10/397,777

(22) Filed: Mar. 26, 2003

(65) Prior Publication Data
US 2003/0200333 A1 Oct. 23, 2003

(30) Foreign Application Priority Data
Mar. 28, 2002 (EP) ................................. 02368033

(51) Int. Cl.
*G06F 15/173* (2006.01)
(52) U.S. Cl. .................. 709/240; 709/238; 709/239; 709/241
(58) Field of Classification Search ............. 709/238, 709/239, 240, 241
See application file for complete search history.

(56) References Cited

U.S. PATENT DOCUMENTS

| | | | | |
|---|---|---|---|---|
| 6,112,248 A | * | 8/2000 | Maciel et al. | 709/238 |
| 6,266,335 B1 | * | 7/2001 | Bhaskaran | 370/399 |
| 6,370,584 B1 | * | 4/2002 | Bestavros et al. | 709/238 |
| 6,785,260 B1 | * | 8/2004 | Goyal et al. | 370/351 |
| 6,985,442 B1 | * | 1/2006 | Wang et al. | 370/232 |
| 2003/0161311 A1 | * | 8/2003 | Hiironniemi | 370/392 |
| 2003/0179704 A1 | * | 9/2003 | Lakkakorpi | 370/230 |

FOREIGN PATENT DOCUMENTS

| | | | | |
|---|---|---|---|---|
| JP | 2001136208 A | * | 5/2001 |
| JP | 2002247087 A | * | 8/2002 |
| JP | 2003258826 A | * | 9/2003 |

* cited by examiner

*Primary Examiner*—Saleh Najjar
*Assistant Examiner*—Liang-che Wang
(74) *Attorney, Agent, or Firm*—David L. Adour; Hoffman, Warnick & D'Alessandro LLC

(57) ABSTRACT

A method for load balancing traffic among routers in a data transmission system that includes a network, a set of routers, and a plurality of groups of servers. Each group of servers transfers its flow of data to the network through a first router, the address of which is assigned by a routing protocol. The load on the first router is compared periodically with a predetermined high threshold. If the load exceeds the high threshold, the priority of the first router is lowered in order to transfer the flow of data to a second router. If the load on the first router is subsequently found to be less that a predetermined low threshold, the priority of the first router is increased in order to transfer the flow of data from the second router back to the first router.

4 Claims, 4 Drawing Sheets

METHOD OF LOAD BALANCING TRAFFIC AMONG ROUTERS IN A DATA TRANSMISSION SYSTEM

TECHNICAL FIELD

The present invention relates to a data transmission system wherein several routers can be used for transferring data from a plurality of servers to a network and relates in particular to a method of load balancing the traffic between routers in such a data transmission system.

BACKGROUND

Load balancing involves providing several pieces of equipment which share a given workload that cannot be handled by a single piece of equipment. Depending upon the type of equipment, several techniques are now used. In the case of web servers, load balancing can be achieved by using a network dispatcher, the function of which is to distribute the task among several web servers transparently to the web customer.

The problem of load balancing is also raised with routers connecting servers to a network. When installed, a router is adapted to receive, on one interface, the traffic from different servers. When the traffic becomes too heavy to handle, the router (because of throughput and/or because of the resources required in the router to process the received data such as CPU, memory, and so forth), it is necessary to introduce a second router that will be able to offload the first one.

A traditional way to split the traffic among several routers is to use the Virtual Route Routing Protocol (VRRP) to send the traffic to different routers. This protocol was created to overcome problems due to the failure of a router in a network using static routing. It allows the servers to see the redundant routers as a single virtual router. At any instant, only one router really owns the virtual router function based on the availability of the router interfaces or on static priorities associated with them by configuration. The interface having the highest priority is the one elected to own the virtual router interface. The associated router acts as a virtual router until it fails or until another interface with a higher priority appears.

The mode of operation using the VRRP protocol is preferable where dynamic host configuration protocols such as DHCP are used. This typically provides configuration for an end host IP address and a default gateway. However, this creates a single point of failure. Loss of the default router results in a catastrophic event isolating all end hosts that are unable to detect any alternate path that may be available. VRRP is designed to eliminate the single point of failure. It specifies an election protocol that dynamically assigns responsibility for a virtual router to one of the VRRP routers. The election process provides dynamic backup in the forwarding responsibility if the primary router (the router having the highest priority) becomes unavailable.

In the above type of configuration, the backup routers are inactive and their spare processing power is not used. However, nothing in the VRRP protocol prevents a router from participating in several elections of virtual routers in several VRRP groups. In practice, VRRP has been used to split the traffic on several routers. The idea is to have the routers participating in different VRRP groups with different priorities. Assuming there are two routers A and B, VRRP will be configured for a first VRRP group in such a way that router A will be the primary and router B will be the secondary. All traffic sent to the virtual router of this group will therefore flow through router A. At the same time, it is possible to configure the routers for another group where router B is the primary whereas router A is the secondary. All traffic sent to the virtual router of this second group will therefore flow through router B.

A drawback of this method is that it is purely static. When configuring the network, it is necessary to make a one-time choice of which flows will use which router. Consequently, the method cannot respond dynamically to changes in traffic, and, in other words, changing the balance of traffic among the routers requires explicit network reconfiguration.

SUMMARY

Accordingly, an object of the invention is to provide a method used in a data transmission system including several routers between the servers and the network, wherein the routers automatically adapt their behavior to the traffic load so that they will share the load without intervention of an external component.

The invention relates therefore to a method of load balancing traffic between routers in a data transmission system including a network, a set of routers, and a plurality of servers grouped in several groups of servers. Each group of servers transfers its flow of data to the network through one of the routers, the address of which has been assigned to this group of servers by a routing protocol. The method is automatically achieved in each router by periodically examining the load (L) of the router and assigning thereto a new priority for at least a group of servers lower than the priorities associated with all routers if the load becomes higher than a predetermined high threshold (Tu), so that the flow of data from the group of servers is automatically transferred to another router.

BRIEF DESCRIPTION OF THE DRAWINGS

The above and other objects, features and advantages of the invention will be better understood by reading the following detailed description of the invention in conjunction with the accompanying drawings wherein.

DETAILED DESCRIPTION

Figure 1:
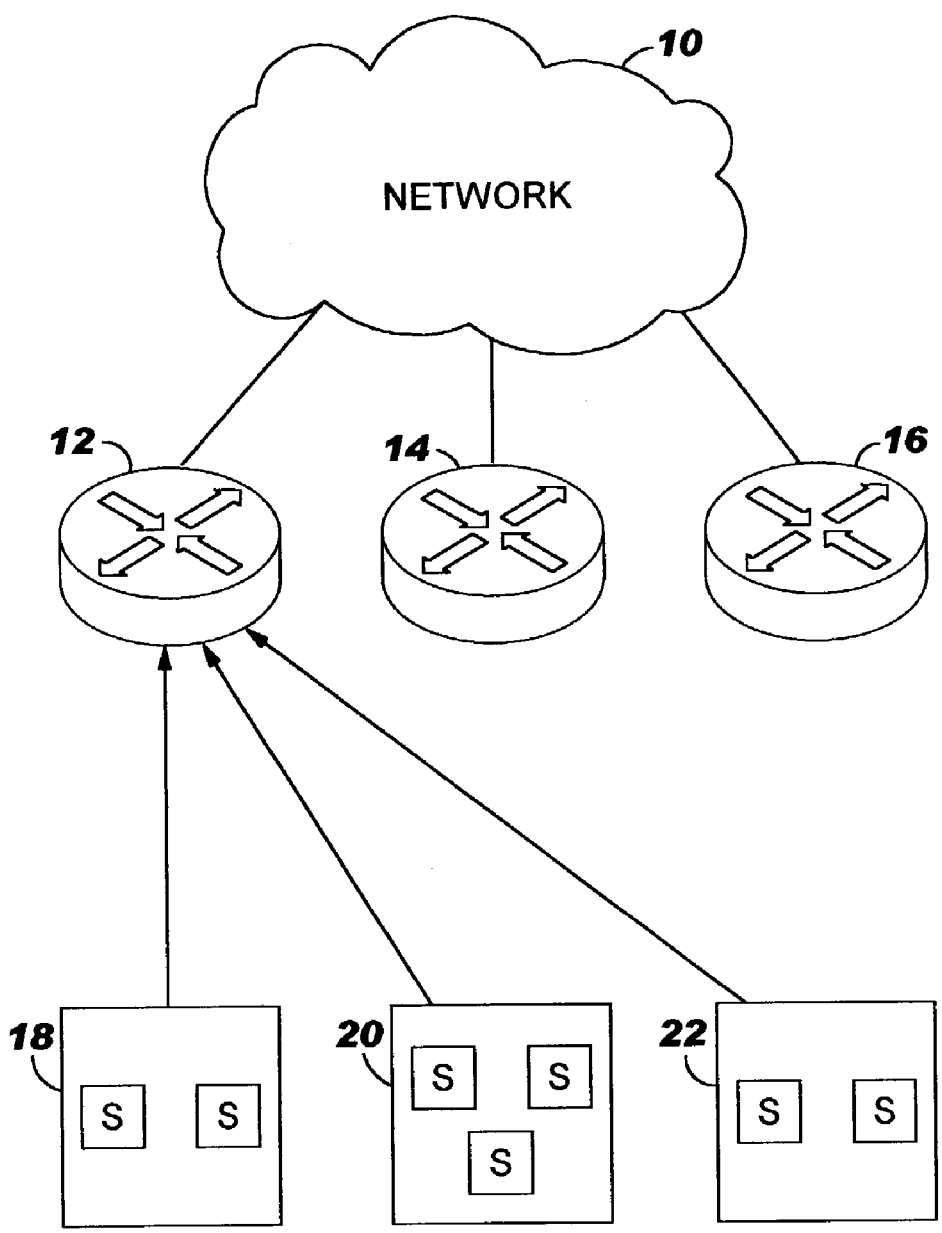
FIG. 1 is a block-diagram representing a data transmission system wherein a single router amongst three routers is used to transfer data from several groups of servers to a network.
Figure 2:
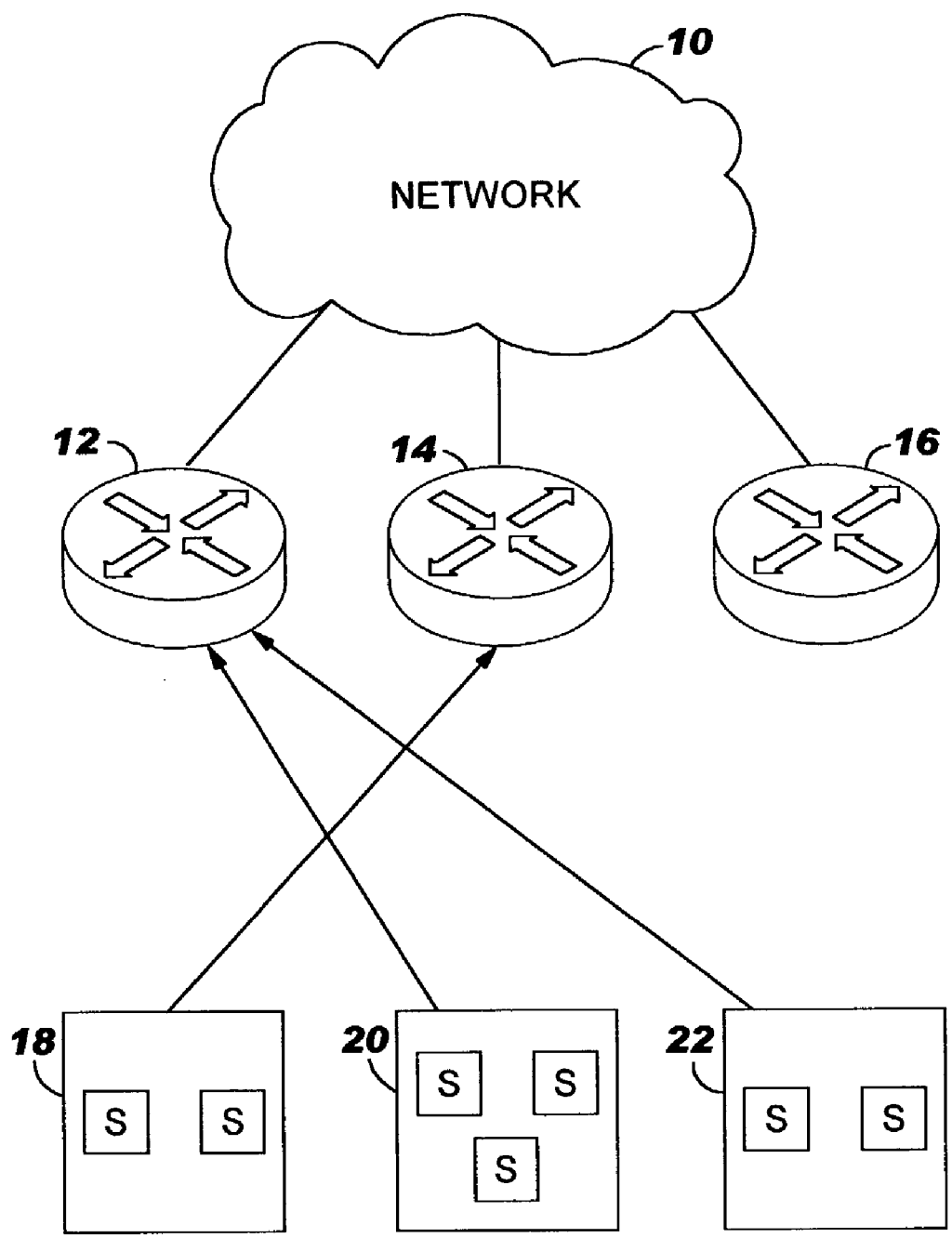
FIG. 2 is a block-diagram representing the system illustrated in FIG. 1 when the current load of the first router is higher than a predetermined high threshold and a part of this load has been transferred to a second router.
Figure 3:
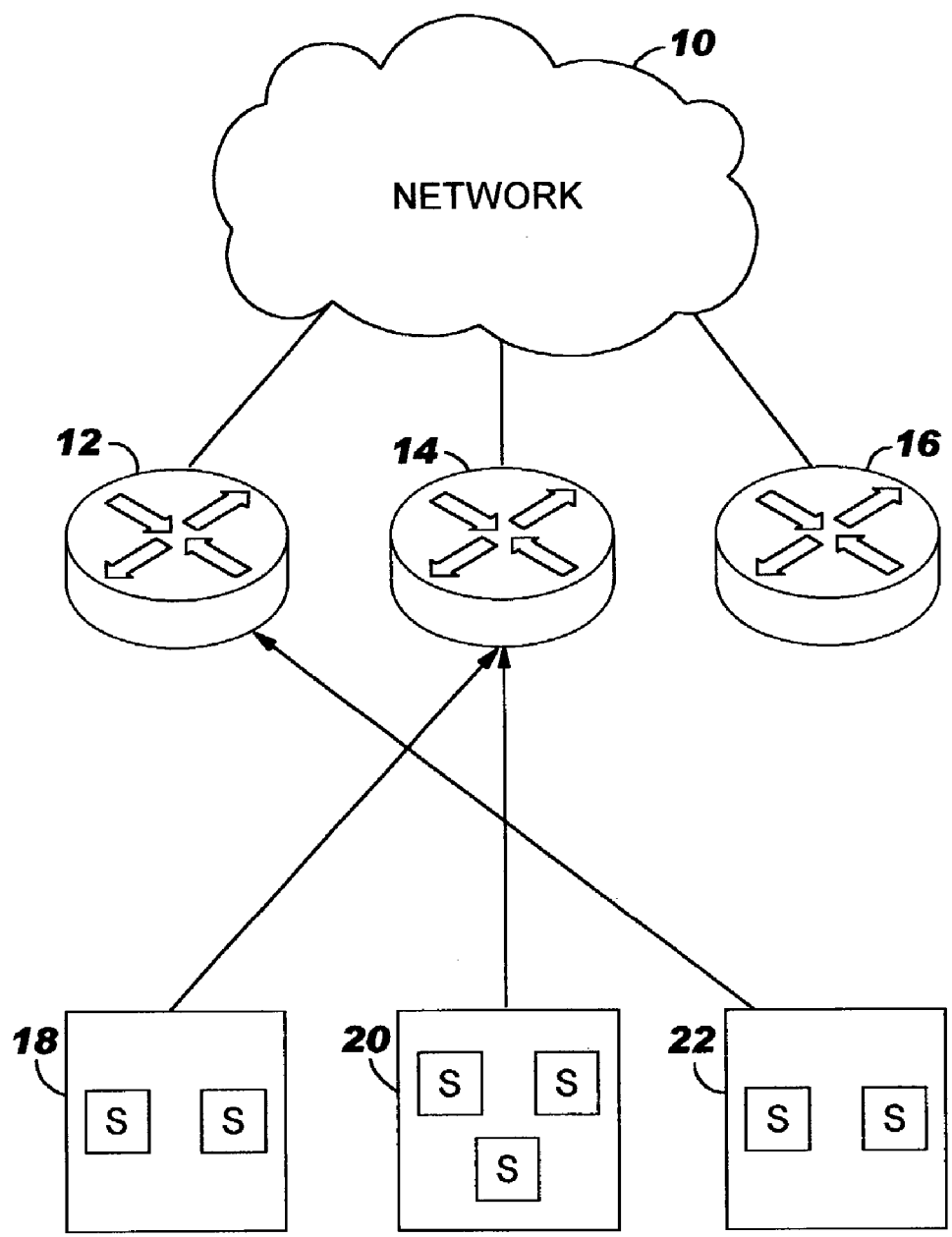
FIG. 3 is a block-diagram representing the system illustrated in FIG. 2 when the current load of the first router is again higher than the predetermined high threshold and another part of this load has been transferred to the second router.

The method according to the invention can be implemented in environments such as the exemplary environments illustrated in FIG. 1, FIG. 2, and FIG. 3, wherein a plurality of servers may access a network 10 by the intermediary of several routers 12, 14, and 16 which are configured to use the Virtual Route Routing Protocol (VRRP) on their interfaces. The servers are grouped in several groups of servers. For example, a first group of servers 18 includes two servers, a second group of servers 20 includes three servers, and a third group of servers 22 includes two servers.

At any instant, only one router really owns the virtual router function based on the availability of the router interfaces and/or static priorities associated with them at the initial time by configuration.

The example illustrated in FIG. 1 assumes that all the traffic goes through a unique router, that is router 12, because this router has been elected by the VRRP protocol as being the primary virtual router. In other words, all groups of servers 18, 20, and 22 have been assigned the address of router 12 by the VRRP protocol to access network 10.

According to the method of the invention, each router continually examines its own load. Assuming that the workload of router 12 becomes higher than a predetermined high threshold, a lower priority is assigned to one of the group of servers, for instance group 18, thus transferring the flow of data to router 14, the priority of which is higher than the priority of router 12 for the group 18, as illustrated in FIG. 2. If the load of router 12 again becomes higher than the predetermined high threshold, the priority of router 12 is replaced by a lower priority for the second group of servers 20, so that the second group of servers 20 transfers its flow of data to router 14, as illustrated in FIG. 3. Note that a higher priority is reassigned to the router when its load becomes less than a predetermined low threshold, thereby causing the flow of each group of servers to transfer back to this router. If the flow of a group of servers, for instance group 18, has been transferred to router 14 as illustrated in FIG. 2, it is not possible to transfer this flow back to router 12 when the load of router 14 becomes higher than the predetermined high threshold. Rather, the flow for the group of servers may be transferred only to router 16.

This method of automatically reassigning, for each group of servers, a lower priority to the router when its load becomes higher than a predetermined high threshold and, reciprocally, reassigning a higher priority to the router when its load becomes less than a predetermined low threshold, is achieved by running the same program in each router.

Figure 4:
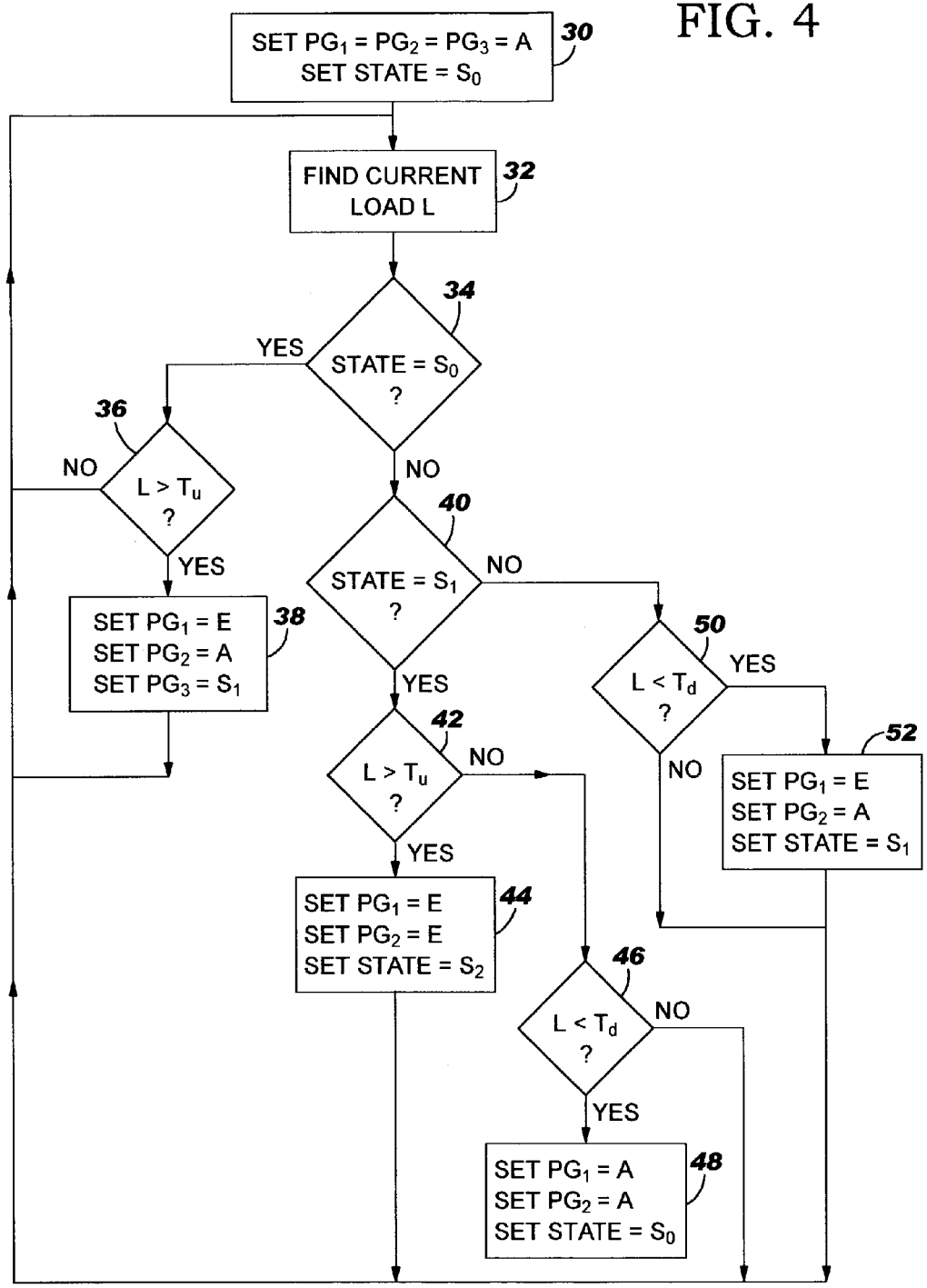
FIG. 4 is a flow chart of the method according to the invention.

Using the system illustrated in FIG. 1, FIG. 2, and FIG. 3, the method according to the invention achieved in router 12 is represented in FIG. 4, bearing in mind that this method is also executed in each router. First, there is an initialization step where the priorities of the router assigned to the three groups of servers are all set to A (step 30). It is assumed that several priorities (A, B, C, E) can be assigned with a ranking as follows:

A>B>C>E.

It is also assumed that at the time when priority of router 12 is A, the priorities of the other routers 14 and 16 are lower. In other words, all the data from the three groups of servers is transferred through router 12.

At the initialization step, a variable STATE is set to $S_0$, whereas two other states $S_1$ and $S_2$ can be established as described hereafter.

The following step is to find the current load L of the router (step 32). A check is then made to determine whether the variable STATE is $S_0$ (step 34). If so, a check is made to determine whether the load L is higher than a predetermined high threshold Tu (step 36). If the load is higher than the predetermined high threshold, the priorities seen from the groups of servers are changed: $PG_1$ is set to E and $PG_2$ is set to A (step 38). At the same time, the variable STATE is set to $S_1$. If the load L is not higher than the threshold Tu, the process loops back to the step of finding the current load L (step 32).

If the STATE is not $S_0$, a check is made to determine whether it is $S_1$ (step 40). If so, a check is made to determine whether the load L is higher than the predetermined high threshold (step 42). If the load is higher than the predetermined high threshold, this means that again a part of the load on router 12 should be transferred to router 14. $PG_1$ and $PG_2$ are set to E, and the STATE is set to $S_2$ (step 44).

If the load L of router 12 in STATE $S_1$ is not higher than Tu, a check is made to determine whether the load L is less than a predetermined low threshold Td (step 46). If the load is less than the predetermined low threshold, this means that the part of the load on router 12 which was transferred to router 14 may be transferred back to router 12. Therefore, $PG_1$ and $PG_2$ are set to A, and STATE is set to $S_0$ (step 48). If the load is not less than the predetermined low threshold, there is no change and STATE remains as $S_1$.

If the check reveals that the STATE is not $S_1$, meaning that the state is $S_2$, a further check is made to determine whether the load of router 12 is less than the predetermined low threshold Td (step 50). If the load is less than the predetermined low threshold, this means that a part of the load which was transferred to router 14 may be transferred back to router 12. Therefore, $PG_1$ is set to E, $PG_2$ is set to A, and STATE is set to $S_1$ (step 52). If the load is not less than the predetermined low threshold, there is no change and STATE remains $S_2$.

Note that it is possible to build the following table describing how the traffic of the VRRP groups ($G_1$, $G_2$, $G_3$) is spread between the routers according to the STATE of each router, i.e., according to the state of router 12 ($R_1$), router 14 ($R_2$), or router 16 ($R_3$)

| Router state | | | Router controlling the group | | |
|---|---|---|---|---|---|
| $R_1$ | $R_2$ | $R_3$ | $G_1$ | $G_2$ | $G_3$ |
| $S_0$ | $S_0$ | $S_0$ | $R_1$ | $R_1$ | $R_1$ |
| $S_1$ | $S_0$ | $S_0$ | $R_2$ | $R_1$ | $R_1$ |
| $S_1$ | $S_1$ | $S_0$ | $R_3$ | $R_1$ | $R_1$ |
| $S_2$ | $S_1$ | $S_0$ | $R_2$ | $R_2$ | $R_1$ |
| $S_2$ | $S_2$ | $S_0$ | $R_3$ | $R_2$ | $R_1$ |

Assuming that router 12 ($R_1$) is in STATE $S_1$ and the two other routers are in STATE $S_0$, the router controlling $G_1$ is router 14 ($R_2$), whereas the router controlling $G_2$ and $G_3$ is router 12 ($R_1$), as illustrated in FIG. 2.

Again, if it is assumed that router 12 ($R_1$) is in STATE $S_2$, router 14 ($R_2$) is in STATE $S_1$, and router 16 ($R_3$) is in STATE $S_0$, the router controlling the groups $G_1$ and $G_2$ is router 14 ($R_2$), whereas the router controlling $G_3$ is always router 12 ($R_1$), as illustrated in FIG. 3.

We claim:

1. An automatic method of load balancing traffic among routers in a data transmission system that includes a network, a set of routers, and a plurality of groups of servers, wherein each group of servers transfers its flow of data to the network through a first router the address of which is assigned to said group of servers by a routing protocol, said method comprising the steps of:
   periodically finding a load and a variable state on the first router;
   comparing the load on the first router to a predetermined high threshold;

if the load on the first router exceeds the predetermined high threshold, assigning to the first router a new priority and a new variable state, wherein the new variable state identifies whether the flow of data has been previously transferred from the first router, so that the flow of data from at least one group of servers transfers from the first router to a second router based on the new variable state; and if the load on the first router is less than a predetermined low threshold, and if the new variable state indicates that the flow of data from the group of servers has been transferred from the first router to the second router, increasing the priority of the first router to transfer the flow of data from the second router back to the first router.

2. The method of claim 1, wherein the routers all have different priorities, and the priority of the second router is the highest priority of the different priorities that is lower than the priority of the first router.

3. A program storage device readable by a machine, tangibly embodying a program of instructions executable by the machine to perform method steps for load balancing traffic among routers in a data transmission system that includes a network, a set of routers, and a plurality of groups of servers, wherein each group of servers transfers its flow of data to the network through a first router the address of which is assigned to said group of servers by a routing protocol, said method steps comprising:

periodically finding a load and a variable state on the first router;

comparing the load on the first router to a predetermined high threshold;

if the load on the first router exceeds the predetermined high threshold, assigning to the first router a new priority and a new variable state, wherein the new variable state identifies whether the flow of data has been previously transferred from the first router, so that the flow of data from at least one group of servers transfers from the first router to a second router based on the new variable; and if the load on the first router is less than a predetermined low threshold, and if the new variable state indicates that the flow of data from the group of servers has been transferred from the first router to the second router, increasing the priority of the first router to transfer the flow of data from the second router back to the first router.

4. A program storage device readable by a machine, tangibly embodying a program of instructions executable by the machine to perform method steps for load balancing traffic among routers in a data transmission system that includes a network, a set of routers, and a plurality of groups of servers, wherein each group of servers transfers its flow of data to the network through a first router the address of which is assigned to said group of servers by a routing protocol, said method steps comprising:

periodically finding a load on the first router;

comparing the load on the first router to a predetermined high threshold;

if the load on the first router exceeds the predetermined high threshold, assigning to the first router a new priority and a new variable state, wherein the new variable state identifies whether the flow of data has been previously transferred from the first router, so that the flow of data from at least one group of servers transfers from the first router to a second router based on the new variable, state; and if the load on the first router is less than a predetermined low threshold, and if the new variable state indicates that the flow of data from the group of servers has been transferred from the first router to the second router, increasing the priority of the first router to transfer the flow of data from the second router back to the first router.

* * * * *